(12) United States Patent
Walter (10) Patent No.: US 7,255,200 B1
(45) Date of Patent: Aug. 14, 2007

(54) APPARATUS AND METHOD FOR OPERATING A SELF-SERVICE CHECKOUT TERMINAL HAVING A VOICE GENERATING DEVICE ASSOCIATED THEREWITH

(75) Inventor: Joanne S. Walter, Alpharetta, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/478,777

(22) Filed: Jan. 6, 2000

(51) Int. Cl.
*A63F 9/02* (2006.01)
*G06K 15/00* (2006.01)
*G06Q 20/00* (2006.01)

(52) U.S. Cl. .......................... 186/64; 186/61; 235/383; 705/16

(58) Field of Classification Search ................ 704/206, 704/207, 208, 260, 261, 266, 267, 268, 270, 704/271, 272, 273, 274, 275, 276; 705/1, 705/500, 16, 17, 18, 19, 20, 21, 22, 23, 24, 705/25; 186/59, 60, 61, 62, 63, 64, 65, 66, 186/67, 68, 52; 235/375, 380, 381, 383, 235/385; 177/25.11–25.18
See application file for complete search history.

(56) References Cited

U.S. PATENT DOCUMENTS

| 4,185,169 | A |   | 1/1980 | Tanimoto et al. | |
|---|---|---|---|---|---|
| 4,623,970 | A | * | 11/1986 | Toyomura | 704/261 |
| 4,676,343 | A | * | 6/1987 | Humble et al. | 186/61 |
| 4,845,739 | A | * | 7/1989 | Katz | 379/92.03 |
| 4,908,850 | A | * | 3/1990 | Masson et al. | 379/88.26 |
| 4,947,028 | A | * | 8/1990 | Gorog | 235/381 |
| 4,964,053 | A | * | 10/1990 | Humble | 705/416 |
| 5,083,638 | A | * | 1/1992 | Schneider | 235/383 |
| 5,115,888 | A | * | 5/1992 | Schneider | 235/383 |
| 5,125,465 | A | * | 6/1992 | Schneider | 177/50 |
| 5,365,050 | A |   | 11/1994 | Worthington et al. | |
| 5,426,282 | A | * | 6/1995 | Humble | 235/383 |
| 5,609,223 | A | * | 3/1997 | Iizaka et al. | 186/61 |

(Continued)

FOREIGN PATENT DOCUMENTS

EP           0 327 514 A           8/1989

*Primary Examiner*—Igor N. Borissov
(74) *Attorney, Agent, or Firm*—Maginot, Moore & Beck LLP; Paul W. Martin (57) ABSTRACT

A retail terminal includes a voice generating device. The retail terminal also includes a processing unit electrically coupled to the voice generating device. Moreover, the retail terminal further includes a memory device electrically coupled to the processing unit. The memory device has stored therein a plurality of instructions which, when executed by the processing unit, causes the processing unit to (a) operate the voice generating device so as to generate a first voice instruction in a first voice type which instructs a user in regard to operation of the retail terminal, (b) determine if the user performs a first activity with the retail terminal which is indicative of the user responding to the first voice instruction and generate a proper-response control signal in response thereto, and (c) operate the voice generating device so as to generate a second voice instruction in a second voice type which instructs the user in regard to operation of the retail terminal if a predetermined amount of time lapses subsequent to generation of the first voice instruction, but prior to generation of the proper-response control signal. A method of operating a retail terminal is also disclosed.

28 Claims, 3 Drawing Sheets

U.S. PATENT DOCUMENTS

| | | | |
|---|---|---|---|
| 5,747,784 A * | 5/1998 | Walter et al. | 235/383 |
| 5,839,104 A * | 11/1998 | Miller et al. | 704/251 |
| 5,842,167 A * | 11/1998 | Miyatake et al. | 704/260 |
| 5,949,854 A * | 9/1999 | Sato | 704/258 |
| 5,965,861 A * | 10/1999 | Addy et al. | 235/383 |
| 6,056,087 A * | 5/2000 | Addy et al. | 186/61 |
| 6,092,725 A * | 7/2000 | Swartz et al. | 235/383 |
| 6,155,486 A * | 12/2000 | Lutz | 235/383 |
| 6,167,381 A * | 12/2000 | Swaine et al. | 705/17 |
| 6,243,447 B1 * | 6/2001 | Swartz et al. | 379/93.12 |
| 6,324,511 B1 * | 11/2001 | Kiraly et al. | 704/260 |
| 6,354,498 B1 * | 3/2002 | Lutz | 235/383 |
| 6,540,137 B1 * | 4/2003 | Forsythe et al. | 235/383 |
| 6,550,672 B1 * | 4/2003 | Tracy et al. | 235/383 |
| 6,594,632 B1 * | 7/2003 | White | 704/270 |
| 6,615,183 B1 * | 9/2003 | Kolls | 705/26 |

* cited by examiner

APPARATUS AND METHOD FOR OPERATING A SELF-SERVICE CHECKOUT TERMINAL HAVING A VOICE GENERATING DEVICE ASSOCIATED THEREWITH

TECHNICAL FIELD OF THE INVENTION

The present invention relates generally to a retail checkout terminal, and more particularly to an apparatus and method for operating a self-service checkout terminal having a voice generating device associated therewith.

BACKGROUND OF THE INVENTION

In the retail industry, the largest expenditures are typically the cost of the goods sold followed closely by the cost of labor expended. With particular regard to the retail grocery or supermarket industry, the impetus to reduce labor costs has focused on reducing or eliminating the amount of time required to handle and/or process the items or goods to be purchased by a customer. To this end, there have been a number of self-service checkout terminal concepts developed which attempt to substantially eliminate the need for the retail clerk. In particular, a self-service checkout terminal is a system which is operated by a customer without the aid of the retail clerk. What is meant herein by the term "customer" is a person who enters the retailer's store, selects his or her items for purchase from the shopping area of the store, checks out his or items for purchase by use of a self-service checkout terminal (including tendering payment for his or her items for purchase), and then exits the store subsequent to completion of his or her transaction. Hence, as used herein, a customer is distinguished from a retail clerk or other employee of the retailer in that a customer enters the retailer's store for the sole purpose of purchasing items from the store.

Hence, it should be appreciated that in regard to operation of a self-service checkout terminal, the customer scans individual items for purchase across a scanner or weighs items with a product scale and thereafter places the items into a grocery bag, if desired. The customer then pays for his or her purchases either at the self-service checkout terminal if so equipped, or at a central payment area which is staffed by a store employee. Thus, a self-service checkout terminal permits a customer to select, itemize, and in some cases pay for his or her purchases without the assistance of the retailer's personnel.

In general, a customer may have little or no training in the operation of the self-service checkout terminal prior to his or her initial use thereof. Hence, it is generally desirable to provide the customer with a number of instructions which facilitate the customer's use of the self-service checkout terminal. For example, in the case of the operation of a product scanner, it is desirable to instruct the customer as to when the terminal is ready to have item information input through the scanner. Moreover, it is desirable to provide the customer with direction in regard to proper operation of the self-service checkout terminal if it is determined that the customer is operating the terminal improperly. For example, if it is determined that the customer placed an item into a grocery bag without having first scanned or otherwise entered the item, it is desirable to direct the customer to remove the item from the bag and to cease such improper use of the terminal.

However, heretofore utilized methods for providing instruction and/or direction are often difficult for the customer to understand thereby potentially rendering the customer reluctant to use the terminal. If this causes a store employee to constantly be required to assist, investigate, or otherwise intervene into the customer's transaction, the labor savings associated with operation of the self-service checkout terminal are not realized.

What is needed therefore is a retail checkout terminal which overcomes one or more of the above-mentioned drawbacks. What is particularly needed is a self-service checkout terminal which provides instruction and direction to a customer in order to facilitate the customer's operation of the retail checkout terminal in a "user friendly" manner.

SUMMARY OF THE INVENTION

In accordance with a first embodiment of the present invention, there is provided a method of operating a retail terminal. The method includes the step of generating a first voice instruction in a first voice type which instructs a user in regard to operation of the retail terminal. The method also includes the step of determining if the user performs a first activity with the retail terminal which is indicative of the user responding to the first voice instruction and generating a proper-response control signal in response thereto. The method further includes the step of generating a second voice instruction in a second voice type which instructs the user in regard to operation of the retail terminal if a predetermined amount of time lapses subsequent to generation of the first voice instruction, but prior to generation of the proper-response control signal.

In accordance with a second embodiment of the present invention, there is provided a retail terminal. The retail terminal includes a voice generating device. The retail terminal also includes a processing unit electrically coupled to the voice generating device. Moreover, the retail terminal further includes a memory device electrically coupled to the processing unit. The memory device has stored therein a plurality of instructions which, when executed by the processing unit, causes the processing unit to (a) operate the voice generating device so as to generate a first voice instruction in a first voice type which instructs a user in regard to operation of the retail terminal, (b) determine if the user performs a first activity with the retail terminal which is indicative of the user responding to the first voice instruction and generate a proper-response control signal in response thereto, and (c) operate the voice generating device so as to generate a second voice instruction in a second voice type which instructs the user in regard to operation of the retail terminal if a predetermined amount of time lapses subsequent to generation of the first voice instruction, but prior to generation of the proper-response control signal.

In accordance with a third embodiment of the present invention, there is provided a method of operating a retail terminal. The method includes the step of generating a first voice instruction at a first voice inflection level so as to instruct a user in regard to operation of the retail terminal. The method also includes the step of determining if the user performs a first activity with the retail terminal which is indicative of the user responding to the first voice instruction and generating a proper-response control signal in response thereto. Yet further, the method includes the step of generating a second voice instruction at a second voice inflection level so as to instruct the user in regard to operation of the retail terminal if a predetermined amount of time lapses subsequent to generation of the first voice instruction, but prior to generation of the proper-response control signal. The first voice inflection level is different than the second voice inflection level.

It is therefore an object of the present invention to provide a new and useful retail checkout terminal.

It is also an object of the present invention to provide a new and useful method of operating a retail checkout terminal.

It is moreover an object of the present invention to provide an improved retail checkout terminal.

It is further an object of the present invention to provide an improved method of operating a retail checkout terminal.

It is yet another object of the present invention to provide a retail checkout terminal which provides user friendly instruction and direction to a customer in order to facilitate operation of the terminal.

The above and other objects, features, and advantages of the present invention will become apparent from the following description and the attached drawings.

DETAILED DESCRIPTION OF THE INVENTION

While the invention is susceptible to various modifications and alternative forms, a specific embodiment thereof have been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 1:
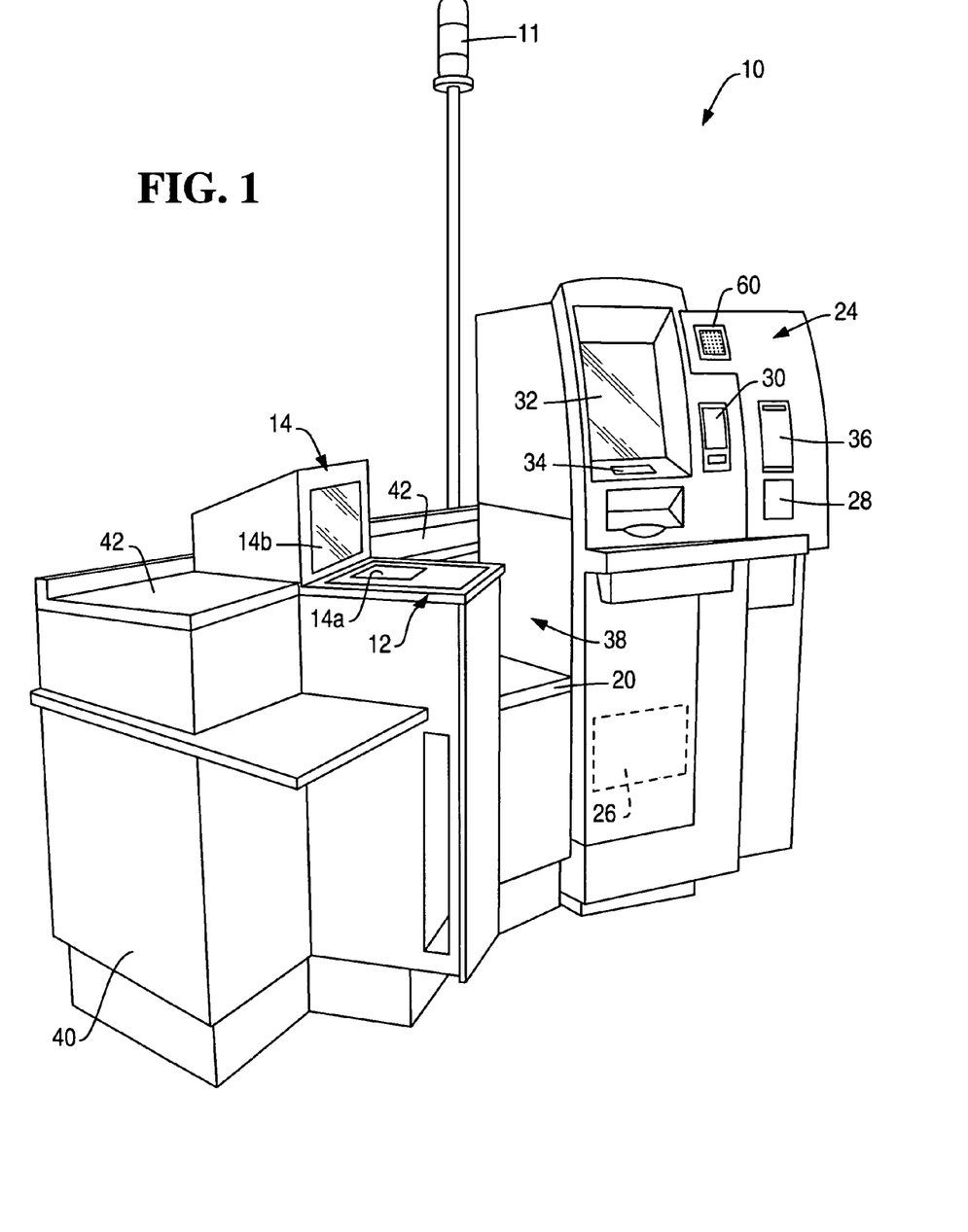
FIG. 1 is a perspective view of a self-service checkout terminal which incorporates the features of the present invention therein.

Referring now to FIG. 1, there is shown a self-service checkout terminal 10 for use in a retail business such as a grocery store. The self-service checkout terminal 10 includes a product scale 12, a scanner 14, a bagwell scale 20, a card reader 30, a display monitor 32, a keypad 34, a printer 36, a processing unit 26, and a speaker assembly 60. The card reader 30, the display monitor 32, the keypad 34, the printer 36, and the speaker assembly 60 may be provided as separate components, or alternatively may preferably be provided as components of an automated teller machine (ATM) 24.

The self-service checkout terminal 10 also includes a bagwell 38 for accommodating one or more grocery bags (not shown) and a base 40 having a counter 42 secured thereto. The counter 42 defines an arcuate surface as shown in FIG. 1. Such an arcuate surface allows the scanner 14 to be positioned relatively close or otherwise proximate the ATM 24 and hence the components associated therewith. Such a configuration facilitates a user's (e.g. customer's) use of the self-service checkout terminal 10. Moreover, the bagwell 38 is configured to allow two or more grocery bags to be accessed by the customer at any given time thereby allowing a customer to selectively load various item types into the grocery bags. For example, the customer may desire to use a first grocery bag for household chemical items such as soap or bleach, and a second grocery bag for edible items such as meat and produce.

The scanner 14 conventionally scans or reads a product identification code such as a Universal Product Code (UPC), industrial symbol(s), alphanumeric character(s), or other indicia associated with an item to be purchased. One scanner which may be used in the present invention is a model number 7875 bi-optic scanner which is commercially available from NCR Corporation of Dayton, Ohio.

The scanner 14 includes a first scanning window 14a and a second scanning window 14b. The first scanning window 14a is disposed in a substantially horizontal manner, whereas the second scanning window 14b is disposed in a substantially vertical manner, as shown in FIG. 1. The product scale 12 is integrated with the scanner 14. More specifically, the product scale 12 is disposed substantially parallel to the scanning window 14a thereby enveloping the scanning window 14a. If an item such as produce is placed upon the product scale 12 or the first scanning window 14a, the product scale 12 may be used to determine the weight of the item.

The scanner 14 also includes a light source (not shown) such as a laser, a rotating mirror (not shown) driven by a motor (not shown), and a mirror array (not shown). In operation, a laser beam reflects off the rotating mirror and mirror array to produce a pattern of scanning light beams. As the product identification code on an item is passed over the scanner 14, the scanning light beams scatter off the code and are returned to the scanner 14 where they are collected and detected. The reflected light is then analyzed electronically in order to determine whether the reflected light contains a valid code pattern. If a valid code pattern is present, the product identification code may then be utilized to retrieve product information associated with the item (e.g. the price of the item).

The display monitor 32 displays instructions which serve to guide a customer through a checkout procedure. For example, an instruction is displayed on the display monitor 32 which instructs the customer to enter an item into the self-service checkout terminal 10 by either passing the item over the scanner 14, or placing the item on the product scale 12 in order to obtain the weight of the item. The display monitor 32 is preferably a known touch screen monitor which can generate data signals when certain areas of the screen are touched by the customer.

The status light device 11 is provided in order to notify store personnel, such as a customer service manager, that intervention into the customer's transaction is needed. In particular, the status light device 11 may display a first colored light (e.g. yellow) in order to notify store personnel that intervention is needed prior to the end of the customer's transaction. Alternatively, the status light device 11 may display a second colored light (e.g. red) in order to notify store personnel that intervention is needed immediately.

The bagwell scale 20 is a weight scale which monitors the weight of items placed in the bagwell 38 (i.e. into a grocery bag) or onto the portion of the counter 42 which is located proximate the bagwell 38. It should be appreciated that a customer may place an item onto the portion of the counter 42 proximate the bagwell 38 subsequent to entering the item, but prior to placing the item into a grocery bag. For example, if a customer scans a loaf of bread, the customer may want to place the bread onto the portion of the counter 42 proximate the bagwell 38 until one of the grocery bags is nearly full thereby preventing the bread from being crushed. Hence, the bagwell scale 20 may be utilized to monitor the ingress and egress of items into and out of the bagwell 38 along with onto and off of the counter 42. Such monitoring is particularly useful for preventing items which have not been scanned from being placed into a grocery bag.

The speaker assembly 60 is provided to broadcast messages such as instructional voice messages. In particular, collectively the processing unit 26 and the speaker assembly 60 define a voice generating device which may be utilized to generate a number of simulated human voices which are broadcast to the customer operating the self-service checkout terminal 10 thereby providing voice instruction to the customer. The voice instructions may be provided as a number of prerecorded voice messages which are stored in a memory device associated with the processing unit 26. Such prerecorded messages may be broadcast to the customer by use of the speaker assembly 60 at certain times during a retail checkout transaction. For example, if the customer scans a first item with the scanner 14, but then places a second item of greater value in one of the grocery bags within the bagwell 38, a voice message maybe broadcast with the speaker assembly 60 which instructs the customer to remove the item from the bag. It should be appreciated that other types of devices may also be utilized to generate instructional voice messages. For example, the processing unit 26 may execute any known voice synthesizing software which is capable of producing the desired voice messages. Moreover, the self-service checkout terminal 10 may be configured to include a known voice synthesizer which may be utilized as a voice generating device for generating instructional voice messages during operation of the self-service checkout terminal 10. As shall be discussed below in greater detail, certain acoustical characteristics of the simulated voices broadcast on the speaker assembly 60 may be varied in order to create a desired impression on the customer during his or her checkout transaction.

Figure 2:
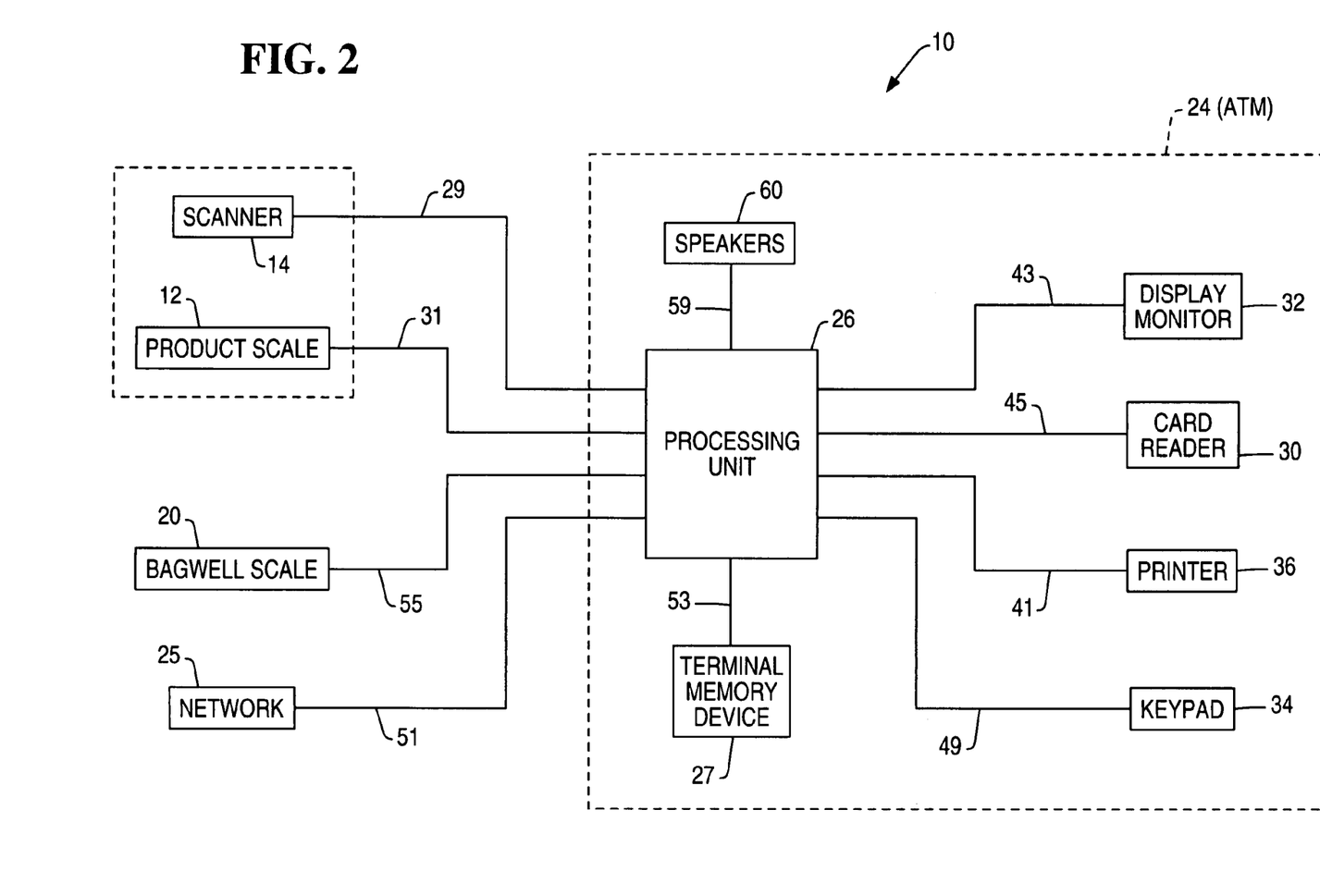
FIG. 2 is a simplified block diagram of the self-service checkout terminal of FIG. 1.

Referring now to FIG. 2, there is shown a simplified block diagram of the self-service checkout terminal 10. The processing unit 26 has a terminal memory device 27 associated therewith and is electrically coupled to the product scale 12, the scanner 14, the bagwell scale 20, the card reader 30, the display monitor 32, the keypad 34, the printer 36, and the speaker assembly 60. The processing unit 26 is also electrically coupled to a network 25 such as the retailer's LAN or WAN.

The processing unit 26 monitors output signals generated by the scanner 14 via a data communication line 29. In particular, when the customer scans an item which includes a product identification code across the scanning windows 14a, 14b, an output signal indicative of the product identification code is generated on the data communication line 29.

The processing unit 26 is coupled to the product scale 12 via a data communication line 31. In particular, when a customer places an item on the product scale 12, the product scale 12 generates an output signal on the data communication line 31 which is indicative of the weight of the item.

The processing unit 26 is coupled to the bagwell scale 20 via a data communication line 55. In particular, when a customer places an item into one of the grocery bags or onto the portion of the counter 42 proximate the bagwell 38, the bagwell scale 20 generates an output signal on the data communication line 55 which is indicative of the weight of the items placed in the grocery bags and/or on the portion of the counter 42 proximate the bagwell 38. Similarly, when a customer removes an item from one of the grocery bags or takes an item off of the portion of the counter 42 proximate the bagwell 38, the bagwell scale 20 generates an output signal on the data communication line 55 which is indicative of the weight of the items removed from the grocery bags and/or taken off of the portion of the counter 42 proximate the bagwell 38.

The processing unit 26 communicates with the display monitor 32 through a data communication line 43. The processing unit 26 generates output signals on the data communication line 43 which cause various messages and transaction data to be displayed on the display monitor 32. As alluded to above, the display monitor 32 may include known touch screen technology which can generate output signals when the customer touches a particular area of the display screen associated with the display monitor 32. The signals generated by the display monitor 32 are transmitted to the processing unit 26 via the data communication line 43.

The keypad 34 is coupled to the processing unit 26 through a data communication line 49. The keypad 34 may include one or more of a known keypad or a touch pad. It should be appreciated that the touch screen associated with the display monitor 32 and the keypad 34 define input devices which may be utilized by a customer to input information associated with operation of the self-service checkout terminal 10. It should also be appreciated that numerous other input devices may also be utilized by the customer to input information associated with operation of the self-service checkout terminal 10.

Moreover, the card reader 30 is coupled to the processing unit 26 through a data communication line 45. The card reader 30 may include a known credit, debit, loyalty, and/or smart card reader which is capable of reading information stored on the customer's card.

The printer 36 is coupled to the processing unit 26 via a data communication line 41. The printer 36 is provided to, for example, print receipts for the customer at the conclusion of his or her checkout transaction.

The speaker assembly 60 is coupled to the processing unit 26 via a data communication line 59. Instructional messages generated by the processing unit 26 are communicated to the speaker assembly 60 via the communication line 59 and thereafter broadcast with the speaker assembly 60 to the customer to assist the customer in regard to his or her use of the self-service checkout terminal 10. As discussed below in greater detail, certain acoustical characteristics associated with the broadcast voice instructional messages are varied based on the customer's operation of the self-service checkout terminal 10. For example, the volume or voice inflection level of the simulated voice broadcast on the speaker assembly 60 may be varied during repeated instructional voice message broadcasts if the customer ignores or otherwise disregards previously broadcast instructional voice messages.

The processing unit 26 includes network interface circuitry (not shown) which conventionally permits the self-service checkout terminal 10 to communicate with the retailer's network 25 such as a LAN or WAN through a wired connection 51. The processing unit 26 communicates with the retailer's network 25 during the checkout procedure in order to obtain information, such as pricing information, associated with an item being scanned, weighed, or otherwise entered, and also to verify customer credit approval when appropriate. The network interface circuitry associated with the self-service checkout terminal 10 may include a known Ethernet expansion card, and the wired connection 51 may include a known twisted-pair communication line. Alternatively, the network interface circuitry may support wireless communications with the retailer's network 25.

The processing unit 26 communicates with the terminal memory device 27 via a data bus 53. The terminal memory device 27 is provided to maintain an electronic transaction table which includes a record of the product information associated with each item that is scanned, weighed, or otherwise entered during the customer's use of the self-service checkout terminal 10. For example, if the customer scans a can of soup, an item-entered control signal is generated thereby causing the description of the soup and the pricing information associated therewith to be recorded in the transaction table in the terminal memory device 27. Similarly, if the customer weighs a watermelon with the product scale 12 and then enters a product lookup code associated with watermelon via the data input device 34, another item-entered control signal is generated thereby causing product information associated with the watermelon to likewise be recorded in the transaction table.

It should therefore be appreciated that the sum of each of the items recorded in the transaction table (1) minus any reductions (e.g. coupons), and (2) plus any applicable taxes is the amount that the customer pays for his or her transaction. Moreover, data stored in the transaction table is printed out on the printer 36 thereby generating a printed itemized receipt for the customer at the end of his or her transaction.

The processing unit 26 also includes sound generating circuitry such as a known PC sound card which conventionally allows the processing unit 26 to generate voice messages which are broadcast on the speaker assembly 60. Moreover, the terminal memory device 27 may also be utilized to store a number of prerecorded instructional voice messages which are selectively broadcast on the speaker assembly 60 by the processing unit 26 so as to provide voice instruction and/or direction to the customer during operation of the self-service checkout terminal 10.

Figure 3:
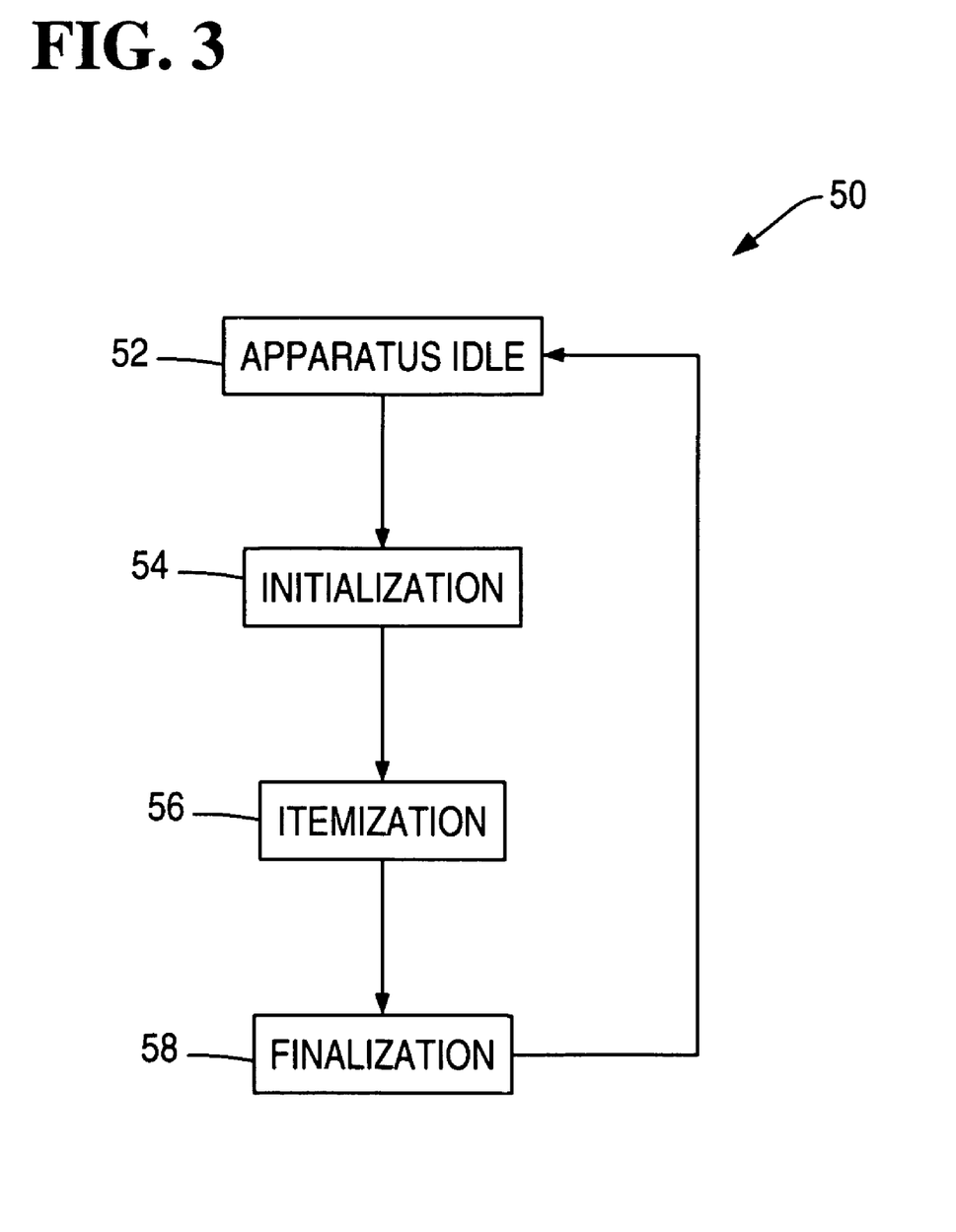
FIG. 3 is a flowchart setting forth a general procedure for checking out items through the self-service checkout terminal of FIG. 1.

Referring now to FIG. 3, there is shown a flowchart which sets forth a general procedure 50 for checking out items through the self-service checkout terminal 10. When the customer arrives at the self-service checkout terminal 10, the terminal 10 is in an idle state (step 52). An initialization step 54 is executed prior to checking out items for purchase. In particular, one or more initialization instructions are displayed on the display monitor 32 which instruct the customer to (1) touch a particular area of the display monitor 32 or push a particular button on the keypad 34 in order to select a desired method of payment, and/or (2) identify himself or herself by inserting a loyalty card, debit card, credit card, or smart card into the card reader 30.

At the completion of the initialization step 54, the procedure 50 advances to an itemization step 56 where the customer scans individual items for purchase across the scanner 14 with the product identification code facing one of the scanning windows 14a and 14b. Moreover, in step 56 the user may place an item on the product scale 12 in order to weigh the item and thereafter enter a product lookup code associated with the item via either the keypad 34 or by touching a particular area of the display monitor 32 if the product identification code printed on the item is not readable by the scanner 14 or if the item is too large or bulky to be scanned with the scanner 14. The customer may also enter an identification code associated with a coupon or voucher via either the scanner 14 (if the coupon or voucher has a bar code printed thereon), the keypad 34, or by touching a particular area of the display monitor 32.

At the completion of the itemization step 56, the procedure 50 advances to a finalization step 58 in which (1) payment is tendered by either inserting currency into a cash acceptor (not shown), charging a credit card or debit card account, or decreasing a value amount stored on a smart card via the card reader 30, and (2) a receipt in the form of an itemized list is printed by the printer 36. It should be appreciated that in the case of when a customer inserts currency into the cash acceptor, the self-service checkout terminal 10 may provide change via a currency dispenser (not shown) and a coin dispenser (not shown). After completion of the finalization step 58, the procedure 50 returns to step 52 in which the self-service checkout terminal 10 remains in the idle condition until a subsequent customer initiates a checkout procedure.

During operation of the check out terminal 10 in the manner described above, assistance or direction is provided to the user (e.g. the customer) by use of the voice generating device (i.e. the combination of the processing unit 26 and the speaker assembly 60). In particular, during operation of the self-service checkout terminal 10, it may be necessary to provide instruction to the customer in regard to operation of the terminal 10. For example, if the customer attempted to scan an item for purchase with the scanner 14, but the scanner 14 was unable to capture the bar code associated with the item, the processing unit 26 generates a voice instructional message which is broadcast on the speaker assembly 60 so as to be audibly detected by the customer. Similarly, a voice instructional message may be broadcast on the speaker assembly 60 which informs the customer to remove an item from a grocery bag if an the item was not scanned or otherwise entered prior to placing the item into the grocery bag.

The initial voice instructional message is broadcast in a voice type which is suited for the particular instruction being broadcast. What is meant herein by the term "voice type" is a simulated voice having predetermined acoustical characteristics which, along with the content of the instructional message, create a desired impression on the customer. For example, in the case of when a customer attempted to scan an item, but the bar code associated with the item was not captured by the scanner 14, the voice instruction which instructs the customer to re-scan the item may be broadcast in a relatively quite, matter-of-factly voice type which, along with the content of the message, conveys an impression to the customer that although the item needs to be re-scanned, there is no immediate concern that the customer is illicitly operating the terminal. However, if the customer places an item into one of the grocery bags without having first scanned the item, the voice instruction which instructs the customer to remove the item from the grocery bag and thereafter re-scan the item may be broadcast in a relatively loud, stern voice type which, along with the content of the message, conveys an impression to the customer that the item needs to be removed from the bag and that there exists a concern that the customer is illicitly operating the terminal.

It should be appreciated that numerous acoustical characteristics of the simulated voice may be varied in order to produce the desired effect or impression on the customer. For example, the volume level at which the voice message is broadcast on the speaker assembly 60 may be varied in order to produce the desired impression on the customer. The voice inflection level of the simulated voice may be varied in order to produce the desired impression on the customer. What is meant herein by the term "voice inflection level" is a combination of the tone level and the pitch level associated with the simulated voice of a particular voice type. Hence, the voice inflection level may be altered in order to create various different voice types by altering the pitch level and/or the tone level of the simulated voice thereby creating the desired impression on the customer.

Moreover, the "gender" of the voice type may be altered to create the desired impression on the customer. For example, if the customer inadvertently enters an incorrect, nonexistent item code into the terminal 10, a friendly female voice type may be utilized to broadcast the instructional message to the customer which informs the customer that the wrong code was entered. However, in the case of when the security software agent associated with the terminal 10 determines that the customer operated the terminal in a manner which is highly suspicious, a relatively terse male voice may be utilized to broadcast the instructional message to the customer.

It should be appreciated that the various voice types described above are intended to be illustrative in nature and that any number or configuration of voice types may be utilized in operation of the terminal 10. In particular, any number or configuration of prerecorded instructional messages may be stored in the memory device 27 in order to fit the needs of a given retailer. Moreover, in the case of use of other types of voice generating devices, any number or configuration of voice types may be utilized as limited only by the design limitations of the particular device being used.

Once the initial instructional voice message has been broadcast to the customer, the processing unit 26 monitors the customer's activity to determine if the customer follows the instruction or instructions given to him or her. In particular, the processing unit 26 monitors output from various terminal components such as the scanner 14, the product scale 12, the bagwell scale 20, the touch screen associated with the display monitor 32, the card reader 30, and the keypad 34 in order to determine if the customer performs an activity which is indicative of the customer following the directions given to him or her in the voice message.

For example, if the initial instructional voice message instructed the customer to enter a product lookup code associated with an item positioned on the product scale 20, the processing unit 26 monitors output from the keypad 34 and the touch screen associated with the display monitor 32 in order to determine if the customer has entered the required lookup code. Moreover, if the initial instructional voice message instructed the customer to re-scan an item which the customer previously attempted to scan with the scanner 14, the processing unit 26 monitors output from the scanner 14 in order to determine if the customer re-scans the item. It should be appreciated that the processing unit 26 may monitor output from more than one terminal component in order to determine if the customer has followed the directions given to him or her by the initial voice message. For example, if the initial instructional voice message instructed the customer to remove an item from one of the grocery bags positioned in the bagwell 38 and thereafter scan the item (because the customer had placed an unscanned item into the bag), the processing unit 26 initially monitors output from the bagwell scale 20 in order to determine if the customer removes the item from the grocery bag, and thereafter monitors output from the scanner 14 in order to determine if the customer scans the item.

If the customer performs the required terminal activity (e.g. re-scans the item or removes the item from the grocery bag and enters the same), a proper-response control signal is generated. In response to generation of the proper-response control signal, the processing unit 26 operates the terminal 10 in order to allow the customer to continue his or her transaction. For example, in the case of when, at the instruction of the terminal 10, the customer properly scans or otherwise enters an item which was previously unentered, generation of the proper-response control signal causes a record associated with the properly entered item to be made in the electronic transaction table such that the item can be accounted for during finalization of the customer's transaction. Moreover, it should be appreciated that a voice message may also be generated in a positive, congratulatory voice type which commends the customer for performing the required terminal activity in response to generation of the proper-response control signal.

If the customer does not respond to the initial instructional voice message within a predetermined period of time (i.e. a predetermined amount of time lapses subsequent to generation of the initial voice message, but prior to generation of the proper-response control signal), the processing unit 26 generates a second instructional message which re-instructs the customer to perform the desired activity. For example, if the customer does not re-scan an item within a predetermined period of time of having been instructed to do so, a second instructional voice message is broadcast to the customer which re-instructs the customer to re-scan the item. The second voice message may be broadcast in the same voice type as the first voice message, or may alternatively be broadcast in a different voice type. For example, the second voice message may be broadcast at a slightly louder volume level than the first voice message. Moreover, the second voice message may be broadcast at a voice inflection level which conveys an impression of greater urgency or seriousness than the voice inflection level that was utilized in the broadcast of the first voice message.

As with the first voice message, the voice type of the second voice message is configurable to fit the needs of a given retailer. Moreover, the voice type utilized to broadcast the second voice message is also configurable based on the type of instruction being given to the customer. For example, if the customer is being instructed to enter the correct product lookup code for an item of produce resting on the product scale 12, the second voice message (and any subsequent voice messages) may be broadcast in a relatively friendly, gentle voice type since it is likely that the customer is having difficulty locating the correct code, but is probably not trying to commit an impropriety such as theft. However, in the case of when the security software agent associated with the terminal 10 has determined that the customer is operating the terminal 10 in a manner which is indicative of an attempt by the customer to commit an impropriety such as theft, the second voice message (and any subsequent voice messages) may be broadcast in a relatively terse, stern voice type so as to convey the impression of seriousness to the customer.

It should be appreciated that if the customer continues to be unresponsive to the broadcast voice messages, subsequent voice messages may also be broadcast to the customer. As with the second voice message, the voice type utilized in the generation of the subsequent voice messages may be varied so as to produce the desired impression on the customer. Moreover, if the customer continues to ignore the subsequent voice messages, the status light device 11 may be operated so as to summon retail personnel to intervene into the customer's transaction.

Similar to the case of when the customer does not respond to the instructional voice message within a predetermined period of time, is the case of when the customer responds to the instructional voice message in an improper manner. In particular, if the initial instructional voice message instructs a customer to perform a particular terminal activity, but the customer performs a different activity thereby indicating that the customer disregarded the instructional voice message, the processing unit 26 generates a follow-up instructional message which re-instructs the customer to perform the desired activity. For example, if the customer was instruction to enter a product lookup code associated with a produce item resting on the product scale 12, but instead, the customer scans another item for purchase with the scanner 14, a follow-up instructional voice message is broadcast to the customer which re-instructs the customer to enter the necessary product lookup code. The follow-up voice message may be broadcast in the same voice type as the first voice message, or may alternatively be broadcast in a different voice type. For example, the follow-up voice message may be broadcast at a slightly louder volume level than the first voice message. Moreover, the second voice message may be broadcast at a voice inflection level which conveys an impression of greater urgency or seriousness than the voice inflection level that was utilized in the broadcast of the first voice message.

As with the first voice message, the voice type of the follow-up voice message is configurable to fit the needs of a given retailer. Moreover, the voice type utilized to broadcast the follow-up voice message is also configurable based on the type of instruction being given to the customer. For example, if the customer is being instructed to enter the correct product lookup code for an item of produce resting on the product scale 12, the follow-up voice message (and any subsequent voice messages) may be broadcast in a relatively friendly, gentle voice type since it is likely that the customer is not trying to commit an impropriety such as theft. However, in the case of when the security software agent associated with the terminal 10 has determined that the customer is operating the terminal 10 in a manner which is indicative of an attempt by the customer to commit an impropriety such as theft, the follow-up voice message (and any subsequent voice messages) may be broadcast in a relatively terse, stern voice type so as to convey the impression of seriousness to the customer.

Moreover, an electronic security log may be maintained by the processing unit 26 which tracks or otherwise tallies the number of times in which a customer operates the terminal 10 improperly. For example, if the customer places an item into one of the grocery bags without having first scanned the item, an entry or record is made in the security log. Moreover, if the customer fails to remove the item from the bag after having been instructed to do so, a second entry may be made in the security log. If the value of the security log exceeds a predetermined log threshold, a personnel-needed control signal is generated which causes retail personnel to be summoned. For example, in response to generation of the personnel-needed control signal, the status light device 11 may be operated to summon a customer service manager.

Hence, as described herein, the self-service checkout terminal of the present invention provides numerous advantages over heretofore designed terminals. For example, use of a voice generating device to broadcast messages in varying voice types produces an interface between the customer and the terminal 10 which provides an easily understandable media for conveying instruction and direction to the customer relative to heretofore designed terminals.

While the invention has been illustrated and described in detail in the drawings and foregoing description, such an illustration and description is to be considered as exemplary and not restrictive in character, it being understood that only the preferred embodiments have been shown and described and that all changes and modifications that come within the spirit of the invention are desired to be protected.

There are a plurality of advantages of the present invention arising from the various features of the checkout terminal described herein. It will be noted that alternative embodiments of the checkout terminal of the present invention may not include all of the features described yet still benefit from at least some of the advantages of such features. Those of ordinary skill in the art may readily devise their own implementations of a checkout terminal that incorporate one or more of the features of the present invention and fall within the spirit and scope of the present invention as defined by the appended claims.

For example, although the concepts of the present invention are herein described as being utilized in conjunction with the self-service checkout terminal 10, and has significant advantages thereby in the present invention, it should be appreciated that certain of such advantages may be realized by use of the concepts of the present invention in conjunction with other types of retail terminals. For example, a voice generating device which is operable to produce instructional messages in varying voice types may be utilized to provide assistance to a retail checkout clerk or the like who is operating an assisted or "clerk-operated" checkout terminal. Such use of a voice generating device would be particularly useful for assisting new or relatively inexperienced checkout clerks.

What is claimed is:

1. A method of operating a retail terminal, comprising the steps of:

generating a first voice instruction in a first voice type which instructs a user in regard to operation of said retail terminal by the retail terminal;

determining if said user performs a first activity with said retail terminal which is indicative of said user responding to said first voice instruction and generating a proper-response control signal in response thereto by the retail terminal;

generating a second voice instruction in a second voice type different from the first voice type which instructs said user in regard to operation of said retail terminal if a predetermined amount of time lapses subsequent to generation of said first voice instruction, but prior to generation of said proper-response control signal by the retail terminal;

determining if said user performs a second activity with said retail terminal which is indicative of said user disregarding said first voice instruction and generating an improper-response control signal in response thereto by the retail terminal; and activating a light for summoning help following generation of said improper-response control signal by the retail terminal.

2. The method of claim 1, further comprising the steps of:

updating an electronic log value in response to generation of said improper-response control signal by the retail terminal; and comparing said electronic log value to a log threshold and generating a personnel-needed control signal if said electronic log value has a predetermined relationship with said log threshold by the retail terminal.

3. The method of claim 1, wherein:

said step of generating said first voice instruction in said first voice type includes the step of generating said first voice instruction at a first volume level by the retail terminal, said step of generating said second voice instruction in said second voice type includes the step of generating said second voice instruction at a second volume level by the retail terminal, and said second volume level is greater than said first volume level.

4. The method of claim 1, wherein:

said step of generating said first voice instruction in said first voice type includes the step of generating said first voice instruction at a first voice inflection level by the retail terminal, said step of generating said second voice instruction in said second voice type includes the step of generating said second voice instruction at a second voice inflection level by the retail terminal, and said first voice inflection level is different than said second voice inflection level.

5. The method of claim 1, wherein:

said first voice type is configured by the retail terminal to resemble a human female voice, and said second voice type is configured by the retail terminal to resemble a human male voice.

6. The method of claim 1, wherein:

said step of generating said first voice instruction in said first voice type includes the step of generating said first voice instruction at a first voice pitch level by the retail terminal, said step of generating said second voice instruction in said second voice type includes the step of generating said second voice instruction at a second voice pitch level by the retail terminal, and said first voice pitch level is different than said second voice pitch level.

7. The method of claim 1, wherein:

said step of generating said first voice instruction in said first voice type includes the step of generating said first voice instruction at a first voice tone level by the retail terminal, said step of generating said second voice instruction in said second voice type includes the step of generating said second voice instruction at a second voice tone level by the retail terminal, and said first voice tone level is different than said second voice tone level.

8. A retail terminal, comprising:

a light;

a voice generating device;

a processing unit electrically coupled to said voice generating device and said light; and a memory device electrically coupled to said processing unit, wherein said memory device has stored therein a plurality of instructions which, when executed by said processing unit, causes said processing unit to:

(a) operate said voice generating device so as to generate a first voice instruction in a first voice type which instructs a user in regard to operation of said retail terminal, (b) determine if said user performs a first activity with said retail terminal which is indicative of said user responding to said first voice instruction and generate a proper-response control signal in response thereto, (c) operate said voice generating device so as to generate a second voice instruction in a second voice type different from the first voice type which instructs said user in regard to operation of said retail terminal if a predetermined amount of time lapses subsequent to generation of said first voice instruction, but prior to generation of said proper-response control signal, (d) determine if said user performs a second activity with said retail terminal which is indicative of said user disregarding said first voice instruction and generate an improper-response control signal in response thereto, and (e) activate the light for summoning help following said improper-response control signal.

9. The retail terminal of claim 8, wherein said plurality of instructions, when executed by said processing unit, further causes said processing unit to:

(a) update an electronic log value in response to generation of said improper-response control signal, and (b) compare said electronic log value to a log threshold and generate a personnel-needed control signal if said electronic log value has a predetermined relationship with said log threshold.

10. The retail terminal of claim 8, wherein said plurality of instructions, when executed by said processing unit, further causes said processing unit to:

(a) operate said voice generating device so as to generate said first voice instruction at a first volume level, and (b) operate said voice generating device so as to generate said second voice instruction at a second volume level, wherein said second volume level is greater than said first volume level.

11. The retail terminal of claim 8, wherein said plurality of instructions, when executed by said processing unit, further causes said processing unit to:

(a) operate said voice generating device so as to generate said first voice instruction at a first voice inflection level, and (b) operate said voice generating device so as to generate said second voice instruction at a second voice inflection level, wherein said first voice inflection level is different than said second voice inflection level.

12. The retail terminal of claim 8, wherein:

said first voice type is configured to resemble a human female voice, and said second voice type is configured to resemble a human male voice.

13. The retail terminal of claim 8, wherein said plurality of instructions, when executed by said processing unit, further causes said processing unit to:

(a) operate said voice generating device so as to generate said first voice instruction at a first voice pitch level, and (b) operate said voice instruction device so as to generate said second voice instruction at a second voice pitch level, wherein said first voice pitch level is different than said second voice pitch level.

14. The retail terminal of claim 8, wherein said plurality of instructions, when executed by said processing unit, further causes said processing unit to:

(a) operate said voice generating device so as to generate said first voice instruction at a first voice tone level, and (b) operate said voice generating device so as to generate said second voice instruction at a second voice tone level, wherein said first voice tone level is different than said second voice tone level.

15. A method of operating a retail terminal, comprising the steps of:

generating a first voice instruction at a first voice inflection level so as to instruct a user in regard to operation of said retail terminal by the retail terminal;

determining if said user performs a first activity with said retail terminal which is indicative of said user responding to said first voice instruction and generating a proper-response control signal in response thereto by the retail terminal;

generating a second voice instruction at a second voice inflection level different from the first voice inflection level so as to instruct said user in regard to operation of said retail terminal if a predetermined amount of time lapses subsequent to generation of said first voice instruction, but prior to generation of said proper-response control signal, wherein said first voice inflection level is different than said second voice inflection level by the retail terminal;

determining if said user performs a second activity with said retail terminal which is indicative of said user disregarding said second voice instruction and generating an improper-response control signal in response thereto by the retail terminal;

generating a third voice instruction at a third inflection level which instructs said user in regard to operation of said retail terminal in response to generation of said improper-response control signal by the retail terminal;

determining if said user performs a third activity with said retail terminal which is indicative of said user disregarding said third voice instruction and generating another improper-response control signal in response thereto by the retail terminal; and activating a light for summoning help following generation of said other improper-response control signal by the retail terminal.

16. The method of claim 15, further comprising the steps of:

updating an electronic log value in response to generation of said improper-response control signal by the retail terminal; and comparing said electronic log value to a log threshold and generating a personnel-needed control signal if said electronic log value has a predetermined relationship with said log threshold by the retail terminal.

17. The method of claim 15, wherein:

said step of generating said first voice instruction at said first voice inflection level includes the step of generating said first voice instruction at a first volume level by the retail terminal, said step of generating said second voice instruction at said second voice inflection level includes the step of generating said second voice instruction at a second volume level by the retail terminal, and said second volume level is greater than said first volume level.

18. A security method for a self-service retail terminal, comprising the steps of:

generating a first voice instruction in a first voice type which instructs a self-service user in regard to operation of said self-service retail terminal by the retail terminal;

determining if said self-service user performs a first activity with said retail terminal which is indicative of said self-service user responding to said first voice instruction and generating a proper-response control signal in response thereto by the retail terminal;

if a predetermined amount of time lapses subsequent to generation of said first voice instruction, but prior to generation of said proper-response control signal, generating a second voice instruction in a second voice type different from the first voice type in order to convey a desired impression on the self-service user that the self-service user has improperly used the self-service terminal, and to instruct said self-service user in regard to the proper operation of said self-service retail terminal by the retail terminal;

determining if said user performs a second activity with said retail terminal which is indicative of said user disregarding said second voice instruction and generating another improper-response control signal in response thereto by the retail terminal; and activating a light for summoning help following generation of said other improper-response control signal by the retail terminal.

19. The method of claim 18, further comprising the steps of:

generating a third voice instruction in a third voice type different than the first and second voice types in order to convey another desired impression on the self-service user that the self-service user has improperly used the self-service terminal, and to instruct said self-service user in regard to the proper operation of said self-service retail terminal in response to generation of said improper-response control signal by the retail terminal;

determining if said user performs a third activity with said retail terminal which is indicative of said user disregarding said third voice instruction and generating another improper-response control signal in response thereto by the retail terminal; and activating a light for summoning help following generation of said other improper-response control signal by the retail terminal.

20. The method of claim 18, further comprising the steps of:

updating an electronic log value in response to generation of said improper-response control signal by the retail terminal; and comparing said electronic log value to a log threshold and generating a personnel-needed control signal if said electronic log value has a predetermined relationship with said log threshold by the retail terminal.

21. The method of claim 18, wherein:

said step of generating said first voice instruction in said first voice type includes the step of generating said first voice instruction at a first volume level by the retail terminal, said step of generating said second voice instruction in said second voice type includes the step of generating said second voice instruction at a second volume level by the retail terminal, and said second volume level is greater than said first volume level.

22. The method of claim 18, wherein:

said step of generating said first voice instruction in said first voice type includes the step of generating said first voice instruction at a first voice inflection level by the retail terminal, said step of generating said second voice instruction in said second voice type includes the step of generating said second voice instruction at a second voice inflection level by the retail terminal, and said first voice inflection level is different than said second voice inflection level.

23. The method of claim 18, wherein:

said first voice type is configured by the retail terminal to resemble a human female voice, and said second voice type is configured by the retail terminal to resemble a human male voice.

24. The method of claim 18, wherein:
said step of generating said first voice instruction in said first voice type includes the step of generating said first voice instruction at a first voice pitch level by the retail terminal,
said step of generating said second voice instruction in said second voice type includes the step of generating said second voice instruction at a second voice pitch level by the retail terminal, and
said first voice pitch level is different than said second voice pitch level.

25. The method of claim 18, wherein:
said step of generating said first voice instruction in said first voice type includes the step of generating said first voice instruction at a first voice tone level by the retail terminal,
said step of generating said second voice instruction in said second voice type includes the step of generating said second voice instruction at a second voice tone level by the retail terminal, and
said first voice tone level is different than said second voice tone level.

26. A method for a self-service retail terminal, comprising the steps of:
generating a first voice instruction in a first voice type instructing a self-service customer to perform a task during a transaction by said retail terminal;
determining if said self-service customer performs the task by said retail terminal; and
if said self-service customer fails to perform the task, generating a second voice instruction in a second voice type by said retail terminal, wherein the second voice type is different than the first voice type and conveys an impression of seriousness to the self-service customer;
determining if said user performs the task following the second voice instruction by the retail terminal; and
if said self-service customer fails to perform the task, activating a light for summoning help by the retail terminal.

27. A method for a self-service retail terminal, comprising the steps of:
generating a first voice instruction in a first voice type instructing a self-service customer to perform a task during a transaction by said retail terminal;
determining if said self-service customer performs the task by said retail terminal; and
if said self-service customer fails to perform the task before a predetermined amount of time lapses subsequent to generation of said first voice instruction, generating a second voice instruction in a second voice type by said retail terminal, wherein the second voice type is different than the first voice type and conveys an impression of seriousness to the self-service customer;
determining if said user performs the task following the second voice instruction by the retail terminal; and
if said self-service customer fails to perform the task before the predetermined amount of time lapses subsequent to generation of said second voice instruction, activating a light for summoning help by the retail terminal.

28. A method for a self-service retail terminal, comprising the steps of:
generating a first voice instruction in a first voice type instructing a self-service customer to perform a first task during a transaction by said retail terminal;
determining if said self-service customer performs a second task different than the first task which is indicative of said self-service customer disregarding the first voice instruction by said retail terminal; and
if said self-service customer performs the second task, generating a second voice instruction in a second voice type by said retail terminal, wherein the second voice type is different than the first voice type and conveys an impression to the self-service customer that the self-service customer is illicitly operating the terminal;
determining if said user performs the first task following the second voice instruction by the retail terminal; and
if said self-service customer fails to perform the first task, activating a light for summoning help by the retail terminal.

* * * * *